United States Patent [19]

Tanaka et al.

[11] Patent Number: 5,136,765
[45] Date of Patent: Aug. 11, 1992

[54] APPARATUS FOR MANUFACTURING EXPANDED MESH SHEET

[75] Inventors: Mashiro Tanaka, Hirakata; Hiroyuki Kobayashi, Yawata; Akira Inanobe, Toyohashi; Yoshio Goda, Yao, all of Japan

[73] Assignee: Matsushita Electric Industrial Co., Ltd., Osaka, Japan

[21] Appl. No.: 635,703

[22] Filed: Dec. 28, 1990

[30] Foreign Application Priority Data

Dec. 28, 1989 [JP] Japan .................................. 1-344095

[51] Int. Cl.⁵ ...................... B21D 31/04; H01M 35/04
[52] U.S. Cl. ............................................. 29/6.1; 29/2
[58] Field of Search ................... 29/2, 6.1, 6.2; 72/203

[56] References Cited

U.S. PATENT DOCUMENTS

| | | |
|---|---|---|
| 1,578,366 | 3/1926 | Redding et al. . |
| 1,927,542 | 9/1933 | Coryell . |
| 4,297,866 | 11/1981 | Sakauye et al. . |
| 4,303,747 | 12/1981 | Bender ............................... 29/6.1 X |
| 4,305,187 | 12/1981 | Iwamura et al. . |
| 4,315,356 | 2/1982 | Laurie et al. . |
| 4,649,607 | 3/1987 | Kuhn II ................................. 29/6.1 |
| 4,921,118 | 5/1990 | Gass .................................. 29/6.1 X |

FOREIGN PATENT DOCUMENTS

| | | |
|---|---|---|
| 60-29573 | 7/1985 | Japan . |
| 2034610 | 6/1980 | United Kingdom . |
| 2054438 | 2/1981 | United Kingdom . |
| 2120138 | 11/1983 | United Kingdom . |

Primary Examiner—Timothy V. Eley
Attorney, Agent, or Firm—Wenderoth, Lind & Ponack

[57] ABSTRACT

A method for manufacturing an expanded mesh sheet, includes the steps of: forming a plurality of slits on a strip at predetermined pitches to simultaneously form a plurality of strip-shaped lift portions and connecting portions connecting the strip-shaped lift portions to each other in a lattice pattern, the slits each being intermittently formed in a longitudinal direction of the strip and the intermittent pattern of adjacent slits in a widthwise direction of the strip being offset from each other in the longitudinal direction of the strip; and expanding the strip in the widthwise direction thereof. An apparatus for manufacturing the sheet, includes: a pair of rolls in coacting meshing engagement with each other, each roll having a plurality of disk-shaped cutters; and a driving device for rotating the rolls. Each cutter has cutting edge portions and reliefs on a periphery thereof at predetermined pitches. The cutting edge portions of the cutters of the rolls form slits defining strip-shaped lift portions while the reliefs leave the connecting portions connecting the strip-shaped lift portions to each other.

4 Claims, 11 Drawing Sheets

Fig. 15(a)
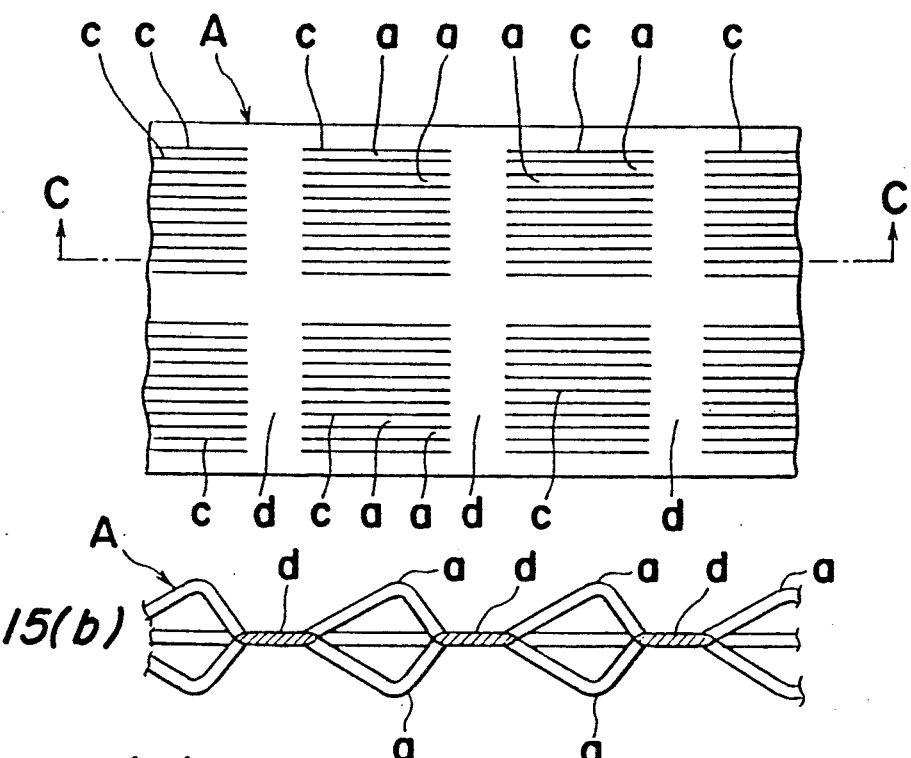
Fig. 15(b)
Fig. 16(a)
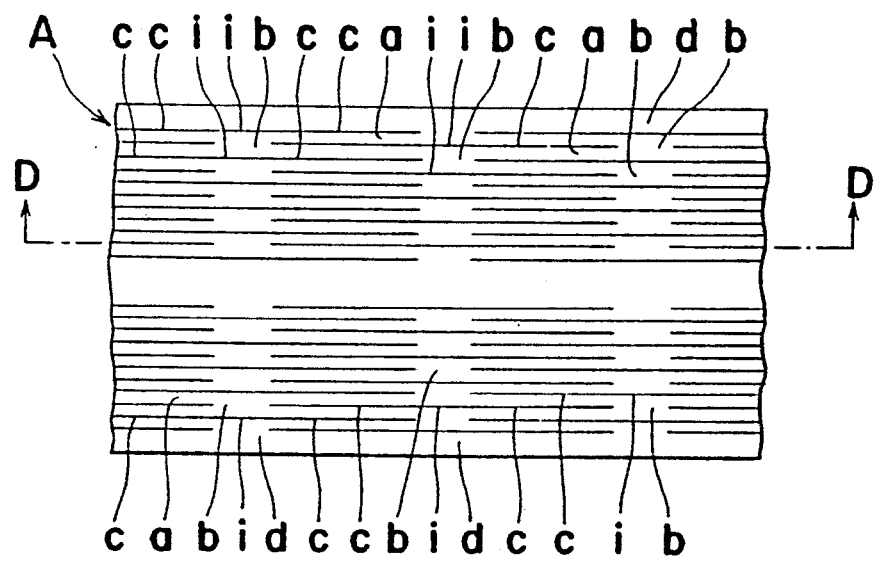
Fig. 16(b)
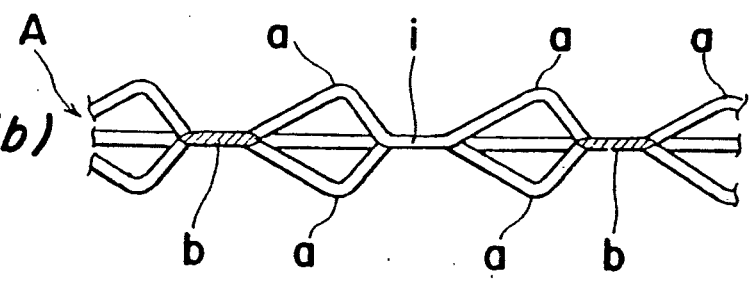

APPARATUS FOR MANUFACTURING EXPANDED MESH SHEET

BACKGROUND OF THE INVENTION

The present invention relates to a method for manufacturing an expanded mesh sheet such as a latticed electrode for use in a battery and a manufacturing apparatus for carrying out the method.

As shown in FIG. 18, in an expanded mesh sheet, many strip-shaped lift portions (a) are connected with each other in a zigzag configuration by latticed connecting portions (b). An apparatus for manufacturing such an expanded mesh sheet is proposed in Japanese Patent Publication No. 60-29573.

According to this conventional art, as shown in FIGS. 15(a) and 15(b), a plurality of slits (c) are intermittently formed on a strip (A) in the longitudinal direction thereof in a first process. In this stage, the slits (c) are arranged in parallel with each other on the strip (A) and the strip-shaped lift portions (a) are formed by the adjacent slits (c). At this time, the strip-shaped lift portions (a) adjacent to each other in the widthwise direction of the strip (A) are bent in directions opposite to each other in approximately the thickness direction of the strip. A flat portion (d) is left extending in a widthwise direction between each adjacent group of slits.

As shown in FIG. 17, the first process is carried out by a first roll (g) comprising a plurality of disk-shaped cutters (f) having projections (e) provided at predetermined pitches in the periphery thereof and in groups in which the projections are superposed as spaced from one another by predetermined intervals in the axial direction of the roll, and a second roll (h). Each strip-shaped lift portion (a) is pressed against the projection (e) approximately in the thickness direction of the strip and is bent into a curved configuration between adjacent flat portions (d).

As shown in FIGS. 16(a) and 16(b), slits (i) for connecting slits (c) in adjacent groups thereof are formed in the flat portions (d) in a second process. Each slit (i) connects every other pair of adjacent slits (c) in the widthwise direction as extending through a flat portion (d). The portions of the strip (A) between the slits (i) adjacent to each other in the widthwise direction constitute the connecting portions (b).

The second process is performed by the second roll (h) and a third roll (j) as shown in FIG. 17. The third roll (j) comprises a plurality of superposed disk-shaped cutters (k), not having the projections (e) formed thereon. Reliefs (l) are provided at predetermined pitches alternately in the right and left sides at the periphery of the disk-shaped cutter (k). Similarly, reliefs (l) are provided in the disk-shaped cutter (f) of the second roll (h) and are opposed to the reliefs (l) of the disk-shaped cutter (k).

In the third process, the strip (A) having the strip-shaped lift portions (a) and the connecting portions (b) formed thereon is expanded widthwise as shown in FIG. 18.

However, the conventional art has the following drawbacks:

1. Slits are formed in two processes and the use of two rolls are necessary for each process. Therefore, time-taking adjustments such as the positioning of the rolls relative to one another and the rotating timing thereof are required to be made before starting an operation, and there is the possibility that a strip will be cut two times.

It is necessary to use three kinds of disk-shaped cutters and in addition, the disk-shaped cutter of the roll used in both processes is consumed in a short time by pressure applied thereto by the two rolls coacting therewith.

2. In shaping the strip, the strip-shaped lift portions are pressed by the top portion of the projection of the disk-shaped cutter and are pulled in the rotational direction of the disk-shaped cutter, with the result that tensile stress concentrates at the rear of the strip-shaped lift portion. In the conventional manufacturing apparatus, as shown in FIG. 19, each projection (e) is symmetrical with respect to a line extending radially of the disk-shaped cutter, and the top portion of each projection (e) is located centrally thereof with respect to the rotational direction of the disk-shaped cutter. Therefore, the length of the rear part of the strip-shaped lift portion (a) is only half of the whole length of the strip-shaped lift portion (a). Accordingly, the thickness of the rear part strip-shaped lift portion (d) is locally reduced and as such, it is likely to break when it is expanded.

3. According to the conventional apparatus, the thicknesses of the disk-shaped cutters (f) and (j) at the reliefs (l) are approximately constant therealong in a direction toward the outer peripheries of the cutters as shown in FIG. 20. Therefore, the disk-shaped cutters are likely to break at the bases of the reliefs (l) remote from the outer peripheries thereof. In particular, the disk-shaped cutters of the rolls used in the two processes are likely to be damaged by the pressure described in item 1 above.

4. As shown in FIG. 21, with the expansion of the strip in the widthwise direction thereof, the connecting portions (b) adjacent to each other in the widthwise direction are separated from each other widthwise, with the result that first, the strip-shaped lift portions (a) become twisted and then, each connection portion (b) rotates in a twist-removing direction. Thereafter, each strip-shaped lift portion (a) is bent with respect to the connecting portion (b) in the direction in which each strip-shaped lift portion (a) has been curved, with the result that the separation of the adjacent connecting portions (b) progresses.

As described above, according to the conventional art, the strip-shaped lift portions are twisted when the strip is initially expanded widthwise. Therefore, a great force is required to effect the expanding operation, so that the life of an apparatus for performing the expanding operation is relatively short.

This drawback is most remarkable when the thickness of the strip is large or the mesh is fine.

SUMMARY OF THE INVENTION

Accordingly, an essential object of the present invention is to provide a method for manufacturing an expanded mesh sheet in which slits are formed in one process and to provide an apparatus for carrying out such a method.

Another important object of the present invention is to provide an apparatus, for manufacturing an expanded mesh sheet, which does not damage the rear portion of a strip-shaped lift portion in a short time.

A further object of the present invention is to provide an apparatus, for manufacturing an expanded mesh sheet, in which the relief portion of a disk-shaped cutter will not be damaged in a short time.

A still further object of the present invention is to provide an apparatus, for manufacturing an expanded mesh sheet, capable of expanding a strip with a small force.

In accomplishing these and other objects, according to one aspect of the present invention, there is provided a method for manufacturing an expanded mesh sheet, comprising the steps of: forming a plurality of slits on a strip at predetermined intervals to simultaneously form a plurality of strip-shaped lift portions and connecting portions connecting the strip-shaped lift portions to each other in a lattice pattern, each of the slits formed intermittently in a longitudinal direction of the strip and the intermittent pattern of adjacent slits in a widthwise direction of the strip being offset from each other; and expanding the strip in the widthwise direction thereof.

According to another aspect of the present invention, there is provided an apparatus for manufacturing an expanded mesh sheet, comprising: a pair of rolls in meshing coacting engagement with each other, each one of the rolls having a plurality of coaxial disk-shaped cutters spaced at approximately the same intervals as thicknesses of the cutters of the other of the rolls, rotary axes of the rolls being parallel to each other, the disk-shaped cutters of each of the rolls being offset from the cutters of the other of the rolls by distances corresponding to the intervals, and peripheral portions of each cutter of one roll being inserted into the spaces between adjacent cutters of the other roll; and driving means for rotating the rolls. Each cutter has cutting edge portions and reliefs alternately provided at predetermined pitches along the periphery of the cutter. Slits are formed on the strip by the cutting edge portions of the cutters of the rolls to define strip-shaped lift portions therebetween and the reliefs form a connecting portion connecting the strip-shaped lift portions to each other between the intermittently formed slits.

According to this aspect of the present invention, slits for providing the strip-shaped lift portion and the connection portion can be simultaneously formed by one pair of rolls. Thus, an adjusting operation to be performed before an expanding operation starts can be easily carried out, and there is no possibility of the strip being cut twice. Further, only one kind of disk-shaped cutter suffices, and the degree to which each disk-shaped cutter is consumed is uniform.

According to a further aspect of the present invention, there is provided the apparatus for manufacturing an expanded mesh sheet, wherein each cutting edge portion has an approximately triangular shape including a top portion displaced in a rotational direction of the corresponding roll from a radial line bisecting a bottom thereof. A surface extending from the top portion thereof towards a rear side thereof in the rotational direction projects in an outwardly radial direction of the cutter and is curved.

According to this aspect of the present invention, since the top portion of the projection is displaced towards the front side in the rotational direction of the disk-shaped cutter, the rear part of the strip-shaped lift portion will be comparatively long. Further, since a curved surface is provided as the rear portion of the projection, a thickness reduction of the rear part of the strip-shaped lift portion can be made to be uniform when shaping the strip-shaped lift portion. Consequently, a local reduction in thickness can be prevented from occurring and the breakage of the strip-shaped lift portion can be mitigated during the expanding operation.

According to still another aspect of the present invention, there is provided the apparatus for manufacturing an expanded mesh sheet, wherein the relief is so formed by an inclined surface of the cutter that a peripheral area of the relief is larger than a bottom area thereof.

According to this aspect of the present invention, since the thickness of a portion of the cutter corresponding to the relief of the disk-shaped cutter is relatively large at the bottom area, the strength of this portion is comparatively high and the durability of the disk-shaped cutter is improved.

According to still another aspect of the present invention, there is provided the apparatus for manufacturing an expanded mesh sheet as described above, and further comprising an expanding means for expanding the strip in an approximately thickness direction of the strip except at a central portion of the strip in the widthwise direction of the strip.

According to this aspect of the present invention, since the strip having the strip-shaped lift portions and the connecting portions formed thereon is expanded in the direction approximately perpendicular to the strip surface, the strip-shaped portions can be bent with respect to the connecting portions in the direction in which the strip-shaped lift portions have been curved, and the strip-shaped lift portions are not twisted unlike the conventional art. Therefore, the strip can be expanded with a comparatively small force.

BRIEF DESCRIPTION OF THE DRAWINGS

FIGS. 15(a) and 15(b) are a plan view of a strip formed according to the conventional art and a sectional view taken along line C—C of FIG. 15(a), respectively;

FIGS. 16(a) and 16(b) are a plan view of a metallic strip having slits formed according to the conventional art and a sectional view taken along line D—D of FIG. 16(a), respectively;

DETAILED DESCRIPTION OF THE PREFERRED EMBODIMENTS

Figure 1:
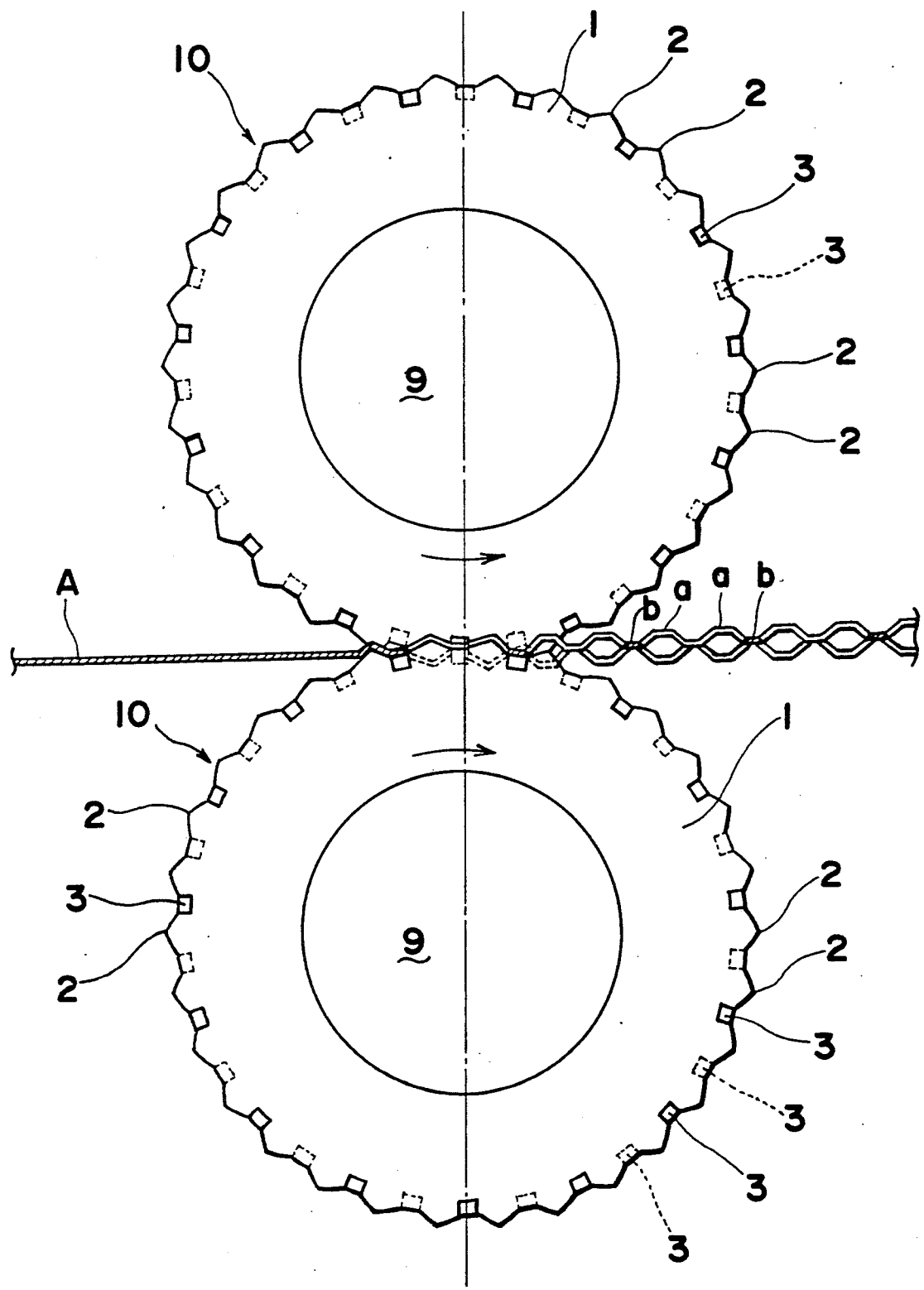
FIG. 1 is a side elevation view of one embodiment of a pair of rolls according to the present invention.

Before the description of the present invention proceeds, it is to be noted that like parts are designated by like reference numerals throughout the accompanying drawings.

An embodiment of the present invention will be described based on FIG. 1 through FIG. 14.

The manufacture of an expanded mesh sheet comprises a first process for providing a strip (A) with a plurality of strip-shaped lift portions (a) and connecting portions (b) for connecting the strip-shaped lift portions (a) with each other, and a second process for expanding the strip (A).

Figure 2:
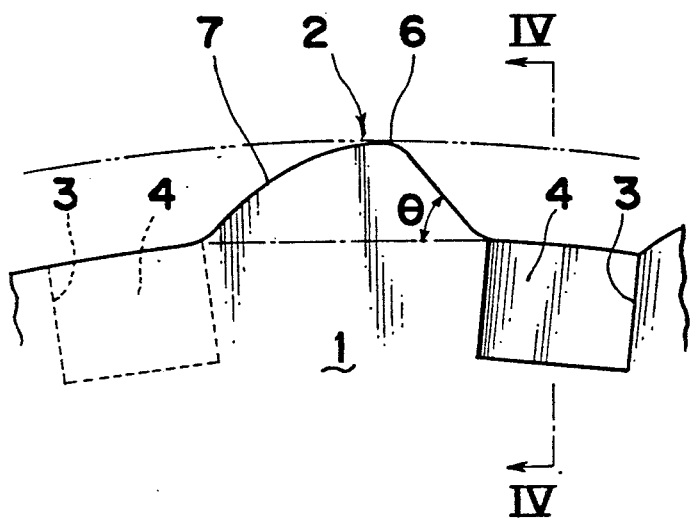
FIG. 2 is a partial side elevation view of a disk-shaped cutter of the roll.
Figure 4:
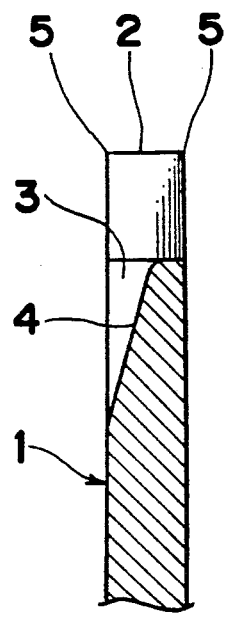
FIG. 4 is a sectional view taken along line IV—IV shown in FIG. 2.
Figure 3:
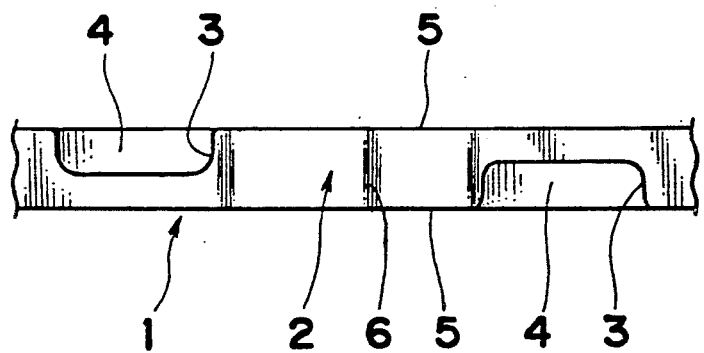
FIG. 3 is a plan view of a portion of the cutter.

A disk-shaped cutter 1 as shown in FIG. 1 is used by the device for performing the first process according to this embodiment. As shown in FIG. 2 through FIG. 4, the disk-shaped cutter 1 has projections 2 for forming the strip-shaped lift portion (a) and reliefs 3 for providing the connecting portion (b), the projections 2 and the reliefs 3 being provided at respective predetermined pitches in the periphery of the disk-shaped cutter 1. Each relief 3 is a groove defined between adjacent projections 2, and the bottom of the groove is defined by an inclined surface 4 of the disk-shaped cutter 1. The relief 3 is so defined by the inclined surface 4 of the cutter that a peripheral area of the relief 3 is larger than a bottom area thereof. The reliefs 3 are alternately formed on the opposite sides of the disk-shaped cutter 1 in the circumferential direction of the disk-shaped cuter 1. Cutting edges 5 for shearing the strip (A), that is, to form a slit in cooperation with the corresponding cutting edges of another disk-shaped cutter 1 coacting therewith, is defined along both sides of the projections 2 and along the peripheral side portions of the cutter where the reliefs 3 are not provided.

Each projection 2 is approximately triangular and the top portion 6 thereof is displaced towards the front of the projection 2 in the rotational direction of the disk-shaped cutter 1. The front peripheral surface of the projection 2 is approximately strip-shaped when the projection 2 is viewed from the side thereof. The front peripheral surface leads the strip (A) in the feeding direction. Preferably, the angle $\theta$ which the front peripheral surface makes with the bottom of the triangular projection 2 is in the range of 45°–90°, the most preferable range being 55°–75°. The top portion 6 serves as the pulling point in shaping the strip-shaped lift portion (a) into an arched configuration, and preferably, the curvature thereof is as small as $\frac{1}{2}$ to 1/1 of the thickness of the strip (A) so that the top portion 6 does not adversely influence the strip-shaped lift portion (a). A curved surface 7 projecting in the radial direction of the disk-shaped cutter 1 is defined at the rear peripheral portion of the projection 2 so that the pulling points sequentially move rearwardly of the projection with the rotation of the disk-shaped cutter 1. Thus, decreases in the thickness of the rear part of the strip-shaped lift portion (a) can be prevented from being localized.

Figure 5:
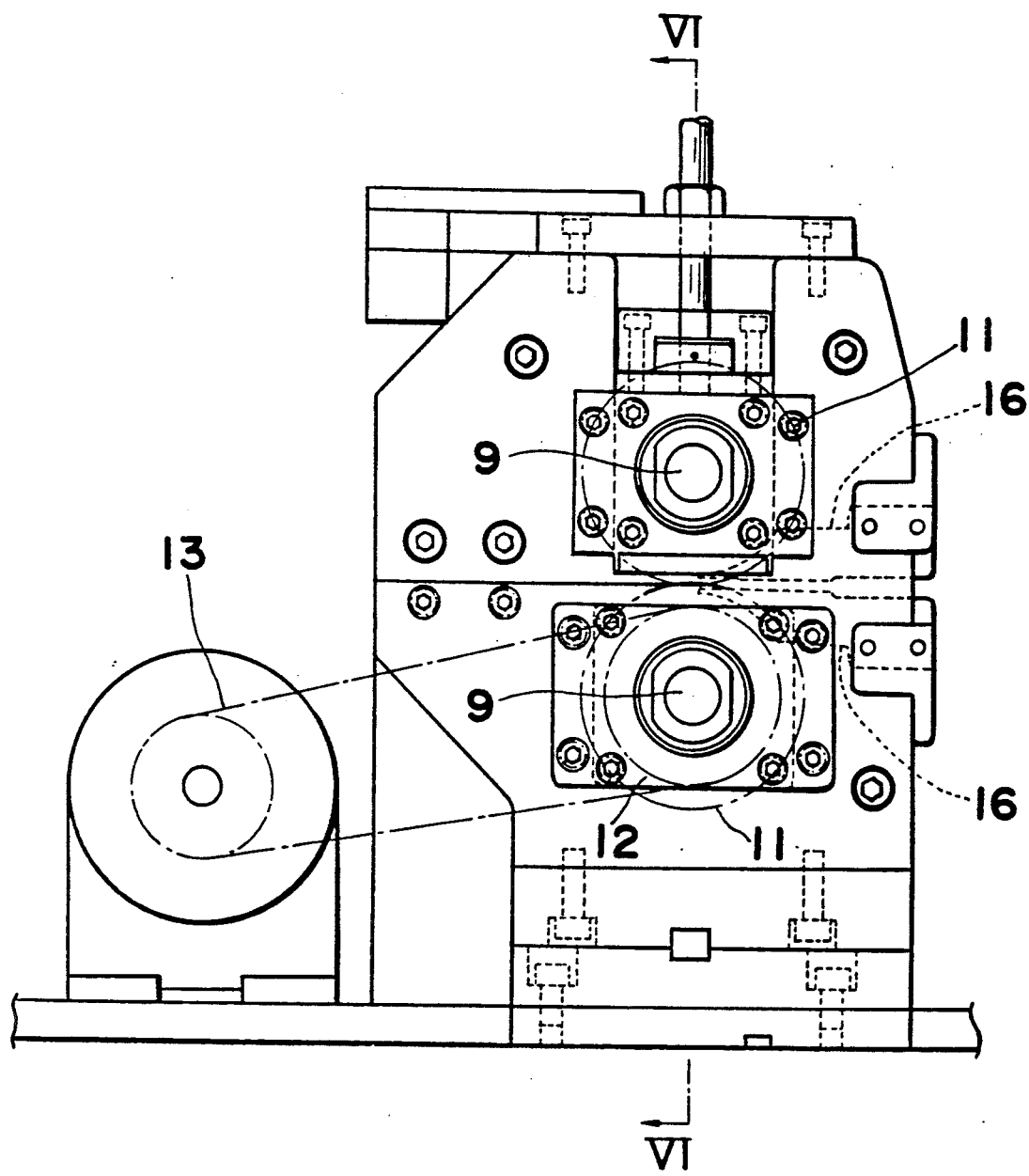
FIG. 5 is a side elevation view of the overall apparatus employing the rolls of FIG. 1.
Figure 6:
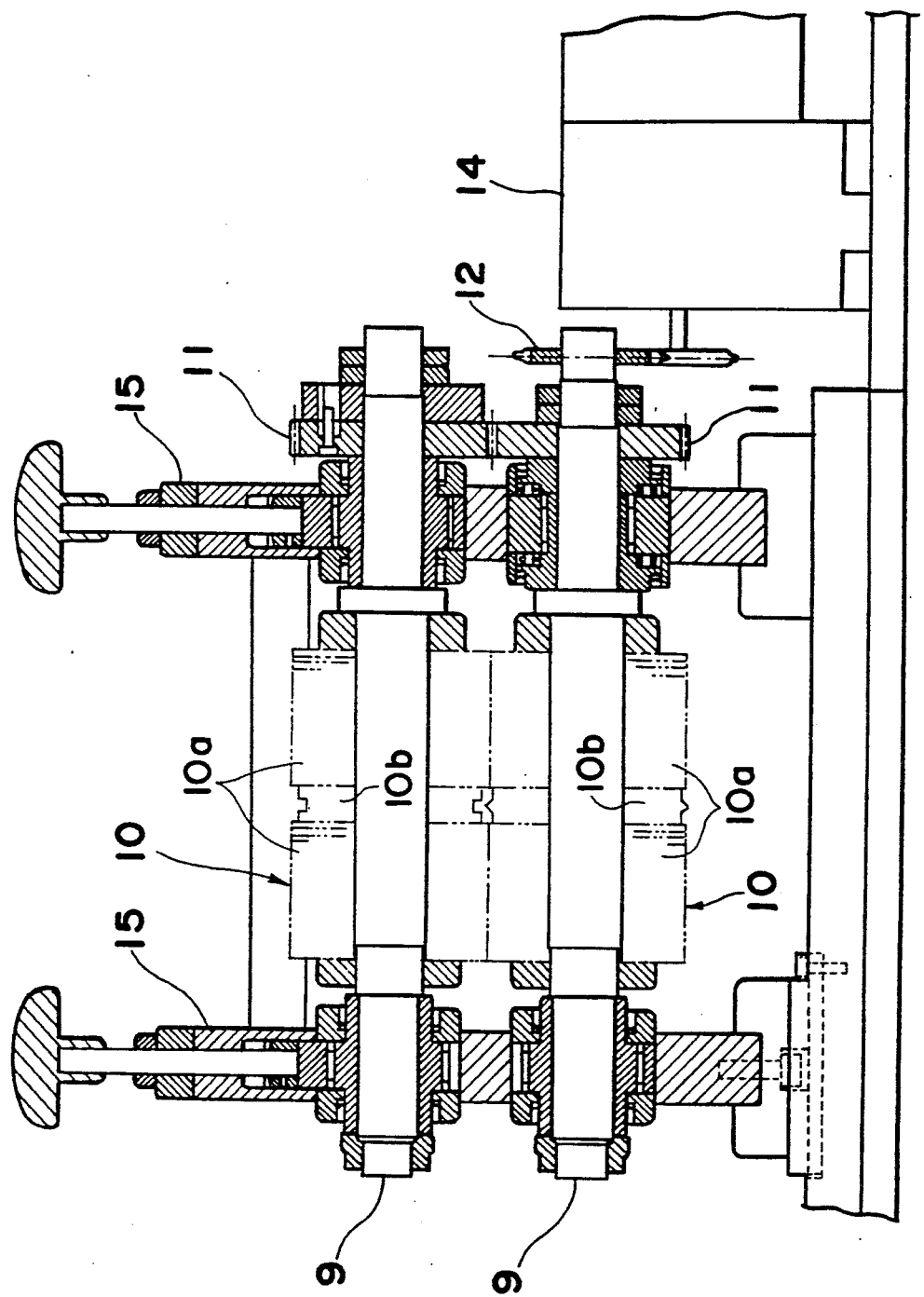
FIG. 6 is a sectional view taken along line VI—VI shown in FIG. 5.

As shown in FIGS. 5 and 6, the device to be used in performing the first process comprises a pair of upper and lower rolls 10, in which the disk-shaped cutters 1 and disk-shaped spacers 8 having diameters smaller than those of the disk-shaped cutters 1 are superposed, and a rotational shaft 9 on which the rolls 10 are supported. In each roll 10, the projections 2 of the disk-shaped cutters 1 are aligned parallel with the rotational shaft 9, and the reliefs 3 in each disk-shaped cutter 1 of the roll 10 are opposed to the reliefs 3 in a disk-shaped cutter 1 of the other roll 10. Both rolls 10 are opposed to each other so that the strip (A) is sheared by an engagement of the cutting edges 5 of the disk-shaped cutter 1 of one roll 10 and the cutting edges of the disk-shaped cutter 1 of the other roll 10 when each relief 3 is located along one line parallel to both rotational centers of the rolls (refer to FIG. 9). A disk-shaped cutter 1 is not provided in the center of each roll 10 with respect to the axial direction thereof so as to leave a non-processed portion of the strip (A) extending in the longitudinal direction thereof at the center of the strip (A). Both rotational shafts 9 are parallel to each other. Each roll 10 has two roll bodies 10a to form the slits and the connecting portions, and a non-process portion 10b arranged between the roll bodies 10a to form the non-process portion in the longitudinal center of the strip (A).

Figure 8:
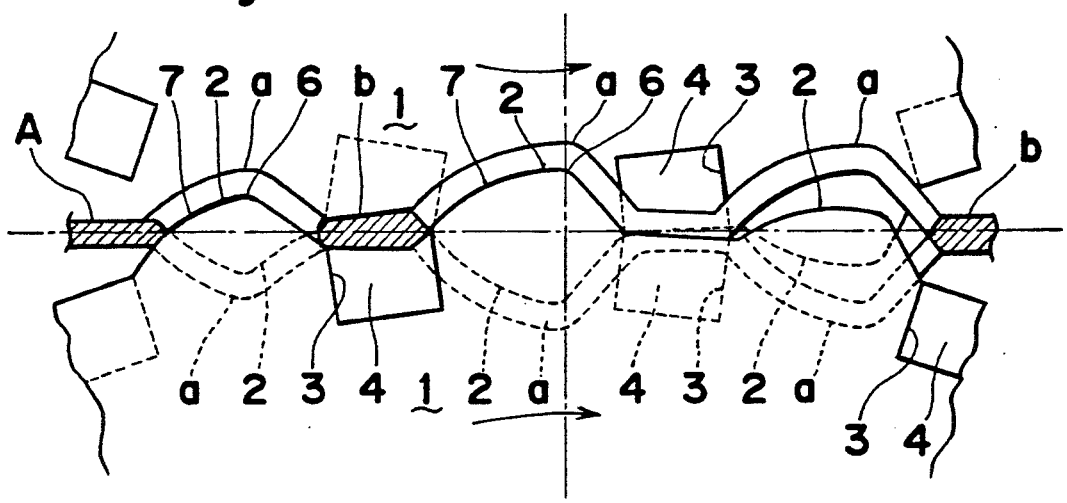
FIG. 8 is a sectional view taken along line VIII—VIII shown in FIG. 7.
Figure 10:
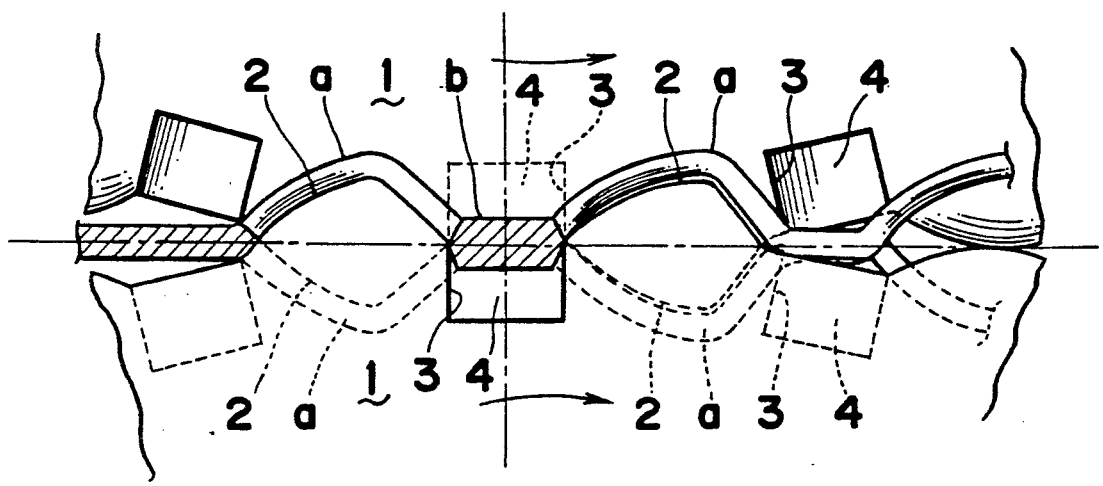
FIG. 10 is a sectional view taken along line X—X shown in FIG. 9.

Each roll 10 is rotatably supported by the main body of the device, and both rolls 10 simultaneously rotate in the direction shown by the arrows in FIGS. 8 and 10 through gears 11 each fixed to one end of a respective rotational shaft 9. A sprocket 12 is fixed to one end of the lower rotational shaft 9 and the rolls 10 are driven by a motor 14 (rotation driving means) via a chain 13 reeved around the sprocket 12. The upper roll 10 can be moved vertically by a vertical position adjusting mechanism 15 provided on the upper portion of the main body of the device, so that the interval between both rolls 10 can be adjusted.

In the main body of the device, a comb-shaped stripper 16 is provided in correspondence with each spacer 8, but out of contact with the spacers 8 and the disk-shaped cutters 1, in order to forcibly release a sheared portion of the strip (A) from the space between the disk-shaped cutters 1 with the rotation of the rolls 10.

Figure 7:
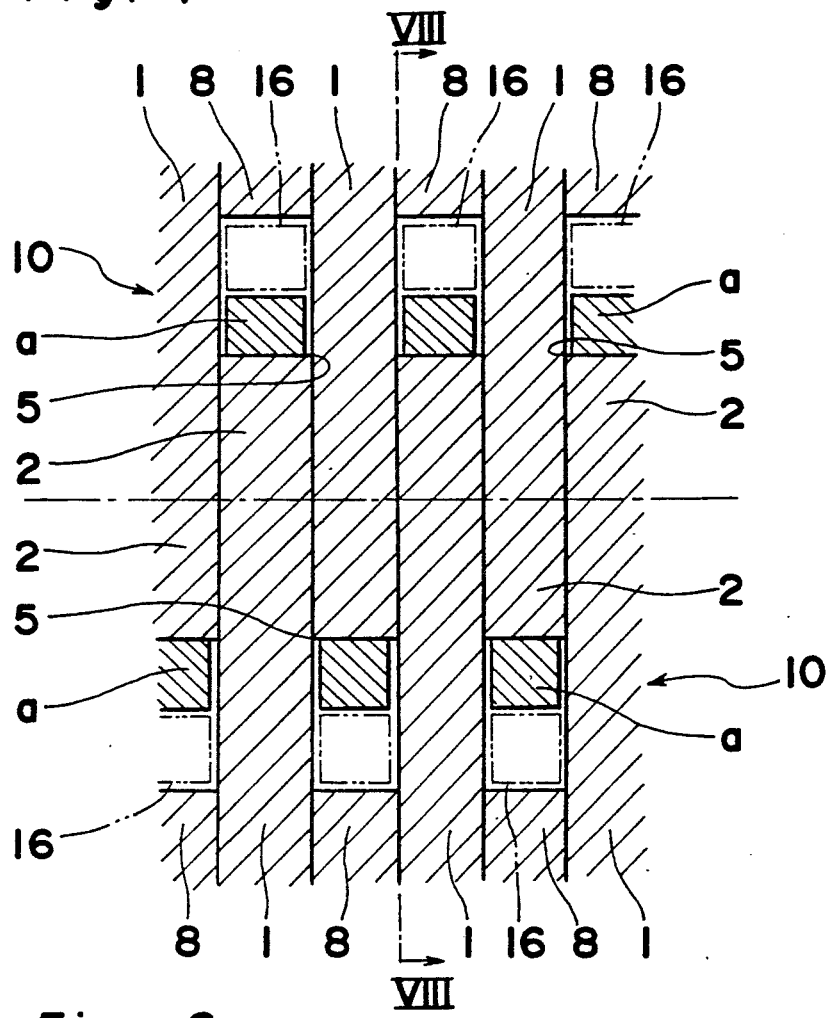
FIG. 7 is a vertical longitudinal sectional view of a portion of the rolls showing an operating state in which a strip-shaped lift portion is formed.
Figure 9:
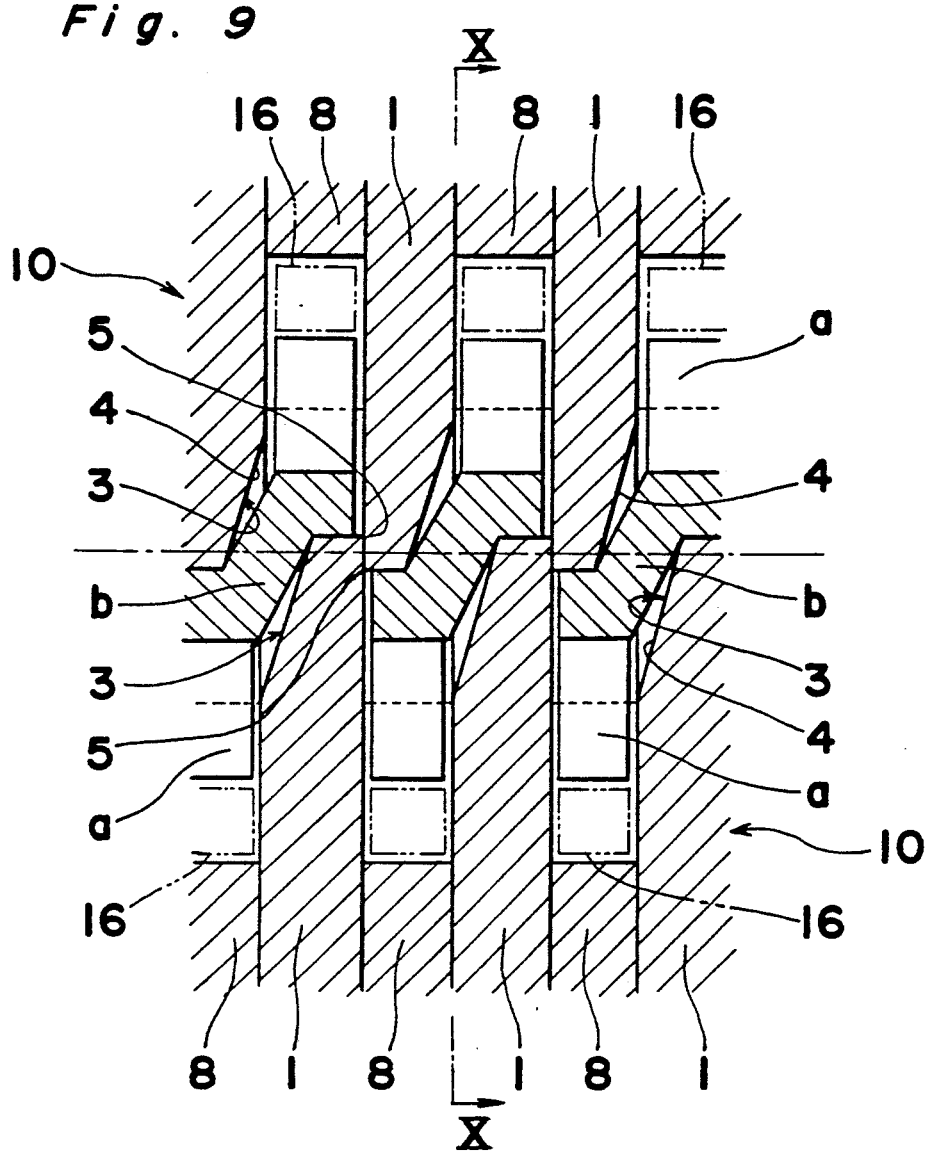
FIG. 9 is a vertical longitudinal sectional view of a portion of the rolls showing an operating state in which a connecting portion is formed.

In the first process, slits are formed on the strip (A), fed into the space between both rolls 10, by the cutting edges 5 of the opposing disk-shaped cutters 1, and the strip-shaped lift portions (a) are shaped by being bent by the projections 2 as shown in FIGS. 7 and 8. The slits are formed at predetermined pitches and the connecting portions (b) are formed between opposing reliefs 3 as shown in FIGS. 9 and 10.

The strip (A) in which the strip-shaped lift portions (a) and the connecting portions (b) have been formed is then subjected to the second process in which the strip (S) is expanded.

Figure 11:
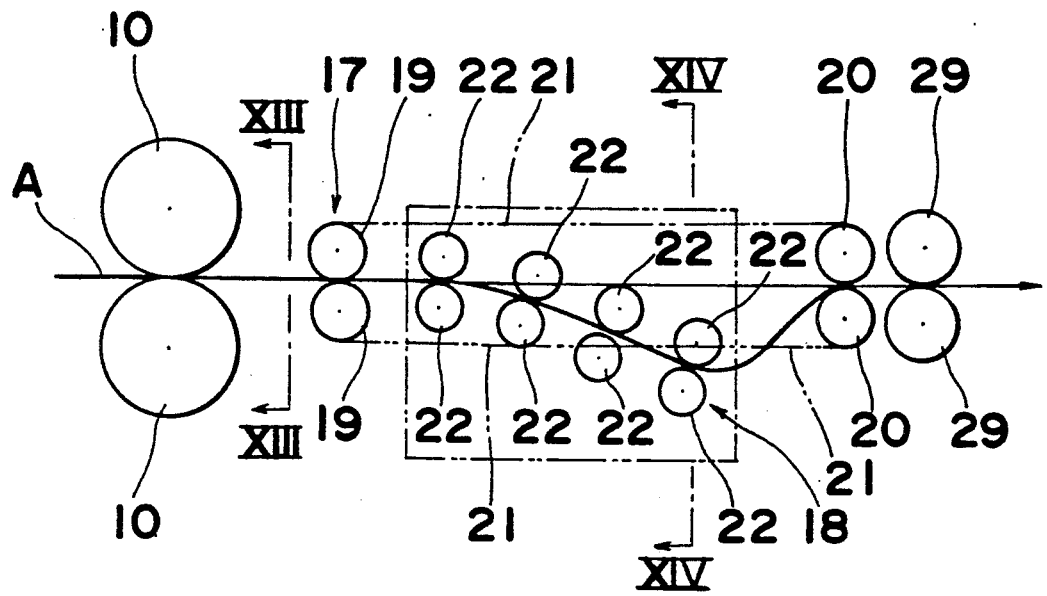
FIG. 11 is a schematic side view of an embodiment of an expanding apparatus according to the present invention.

As shown in FIG. 11, the device to be used to perform the second process comprises a center portion feeding means 17 for supportingly guiding the non-process portion of the strip (A) horizontally, an ear portion feeding means 18 for supportingly guiding both ear portions of the strip (A) in a downward feeding direction, and a flattening means for flattening the expanded strip (A). The center portion feeding means 17 and the ear portion feeding means 18 constitute the expanding means according to this embodiment.

Figure 12:
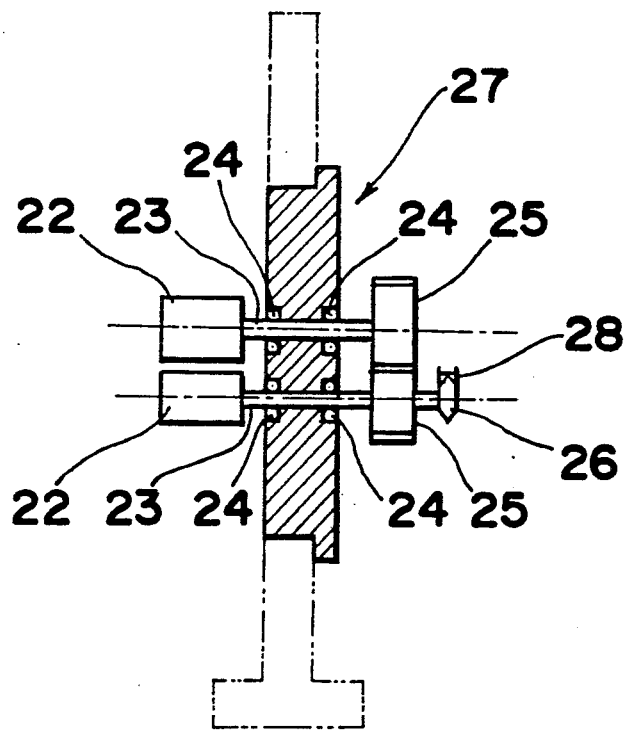
FIG. 12 is a front view, partially in section, of guide means of the expanding apparatus for guiding an ear portion of the expanded mesh sheet.
Figure 13:
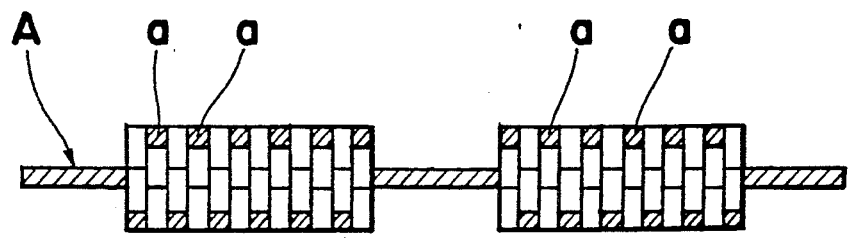
FIG. 13 is a sectional view taken along line XIII—XIII shown in FIG. 11.
Figure 14:
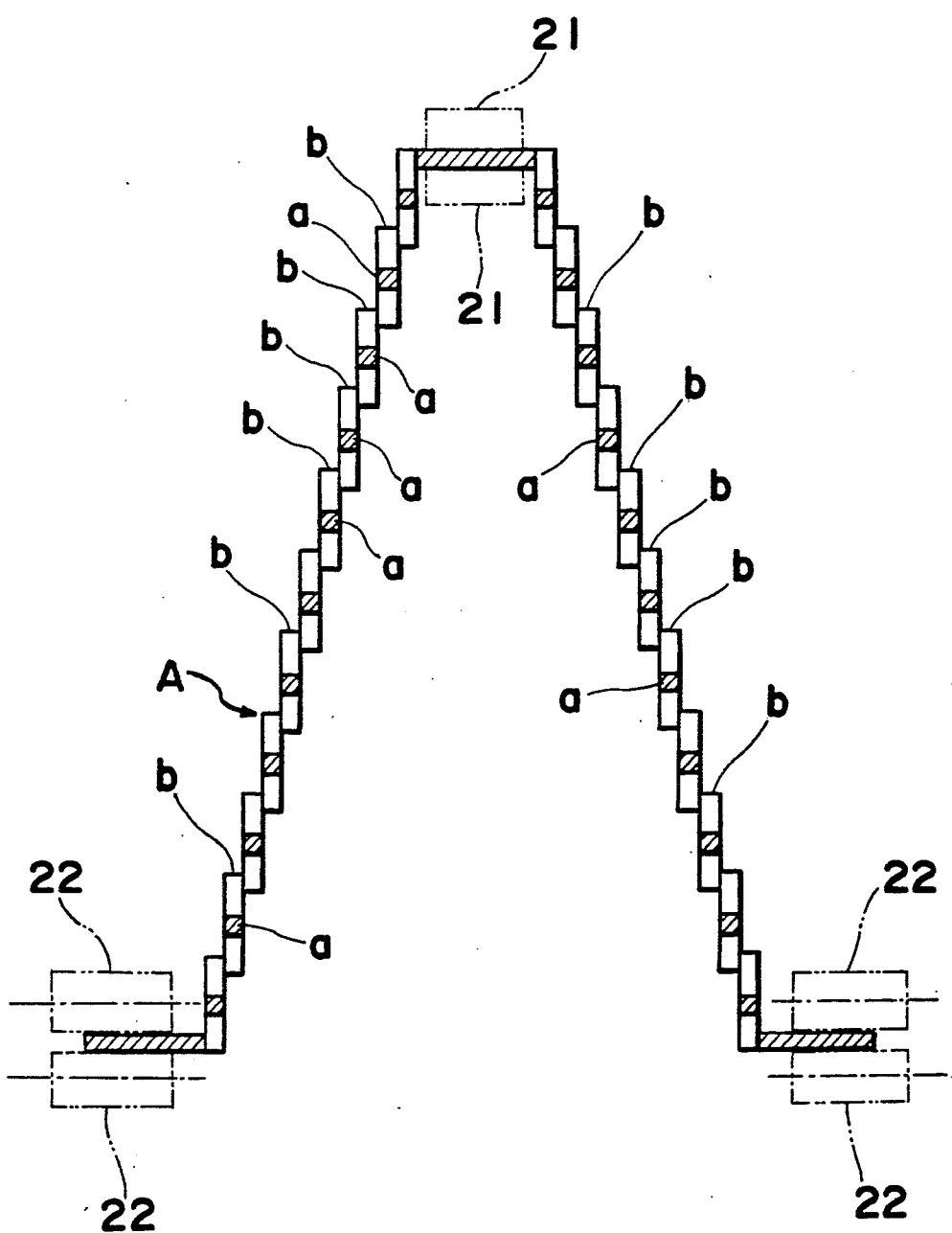
FIG. 14 is a sectional view taken along line XIV—XIV shown in FIG. 11.
Figure 17:
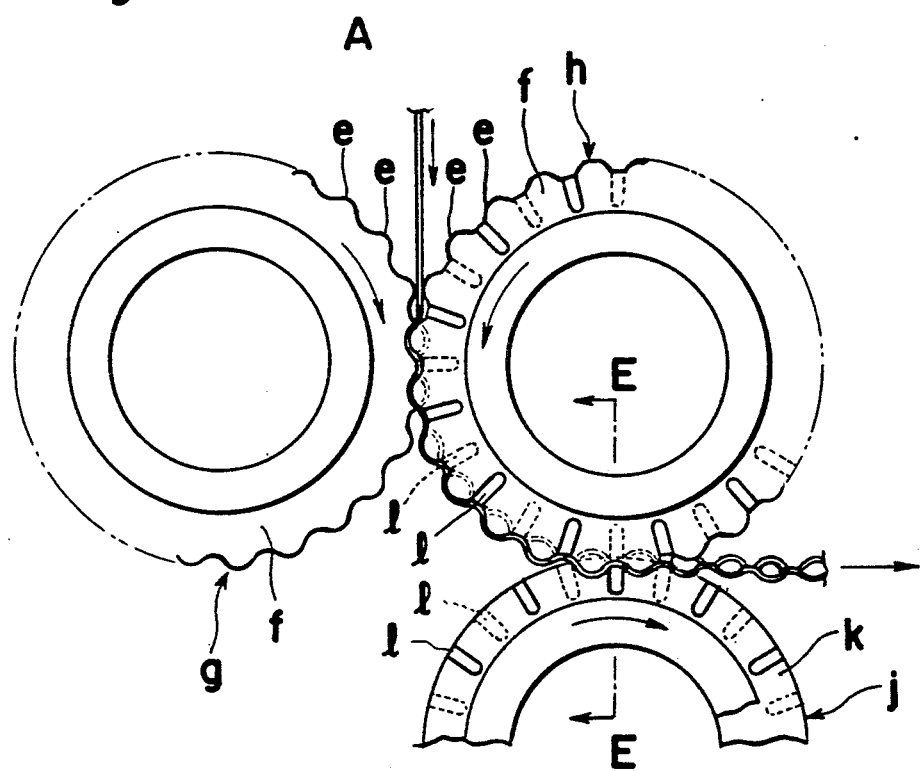
FIG. 17 is a side elevation view of two pairs of coacting rolls used, for forming slits according to the conventional art.
Figure 18:
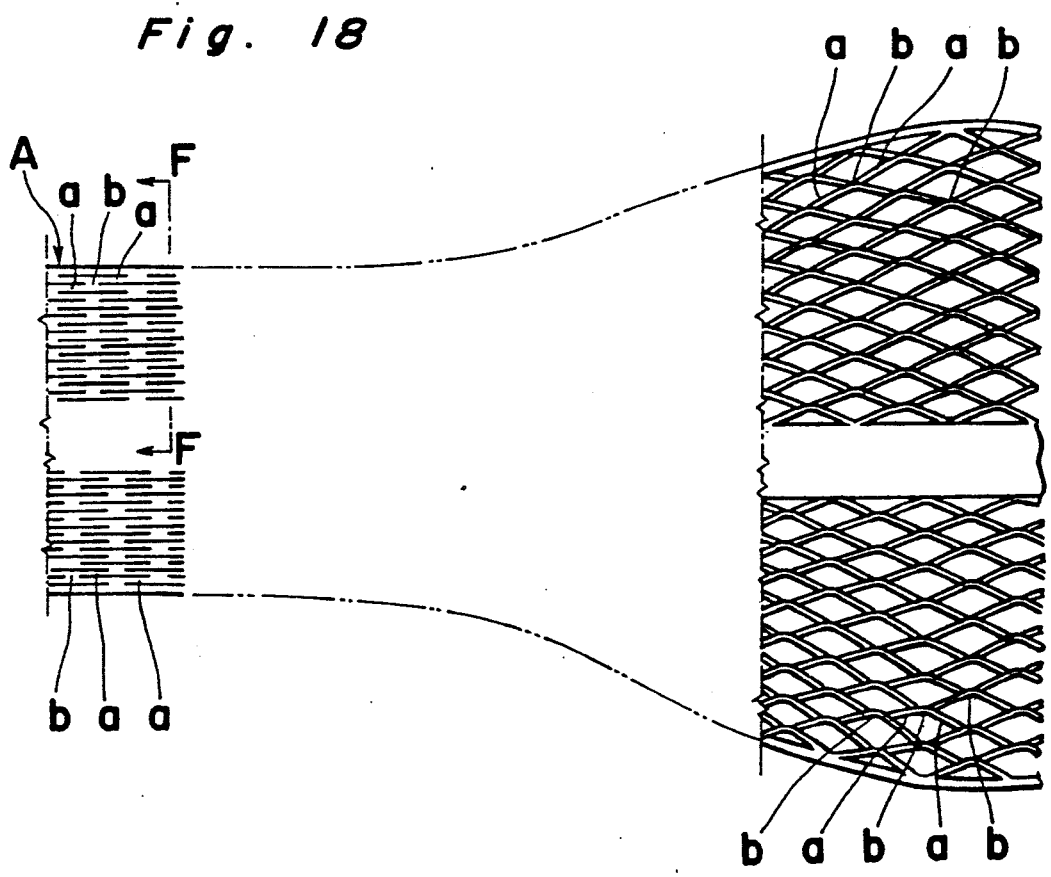
FIG. 18 is a plan view of an expanded strip.
Figure 19:
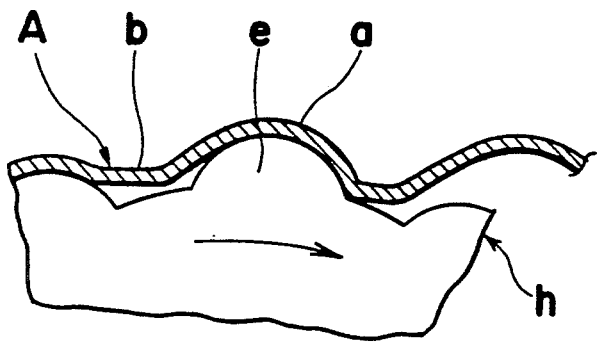
FIG. 19 is a side elevation view of the projection of a disk-shaped cutter of the conventional art.
Figure 20:
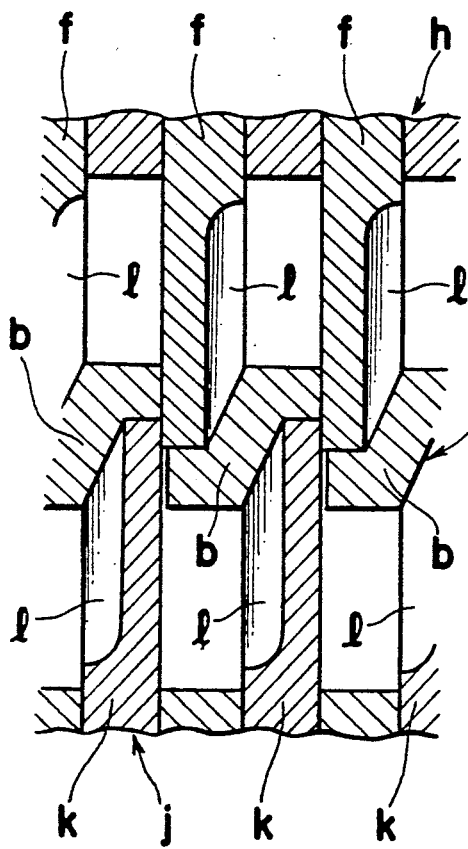
FIG. 20 is a sectional view taken along line E—E shown in FIG. 17.
Figure 21:
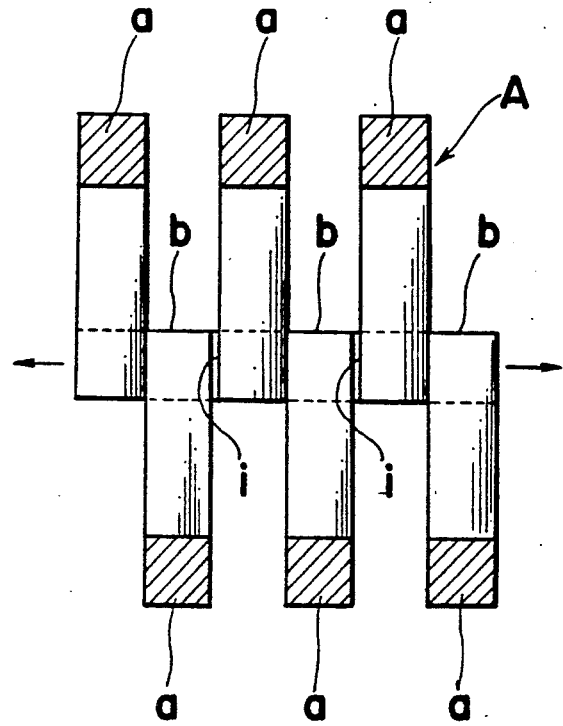
FIG. 21 is a sectional view taken along line F—F shown in FIG. 18.

In the center portion feeding means 17, endless belts 21 spanning a driving roll 19 and a driven roll 20 are respectively provided above and below the strip (A), and the strip (A) is fed by being sandwiched between the upper and lower feeding belts 21. The ear portion feeding means 18 comprises a plurality of units, one of which is shown in FIG. 12, provided on both sides of the strip (A) with the ear portion holding positions of the units being disposed at various levels. Each unit comprises a block 27, the vertical position of which is adjustable, having a pair of upper and flower rolls 22 for holding an ear portion of the strip (A) under pressure, a bearing portion 24 for rotatably supporting the rotational shaft 23 of each roll 22, a gear 25 fixed to one end of each rotational shaft 23, and a sprocket 26 fixed to the rotational shaft 23 of the lower roll 22. The rolls 22 are driven through a chain 28 reeved around the sprocket 26.

The flattening means comprises coacting flattening rolls 29 which press the strip (A) in both upward and downward directions.

In the second process, the connecting portions (b) adjacent to each other in the widthwise direction of the strip (A) can be separated from each other (refer to FIG. 14) without imparting a twist to the strip-shaped lift portions (a) by applying a tensile force perpendicularly to the surface of the strip (A) (refer to FIG. 13) so as to displace each strip-shaped lift portion (a) in the direction in which it had been curvedly shaped.

The bent portion and the non-process portion of the strip (A) thus expanded are made to be flush with each other by the flattening roll 29. Thus, a desired expanded mesh sheet can be obtained.

According to the present invention, slits for providing the strip-shaped lift portions and the connecting portions can be simultaneously formed during a first process. And, the disk-shaped cutter and the operation of adjusting the positioning of the two rolls is comparatively simple. Moreover, since a decrease in the thickness of the strip-shaped lift portion which occurs during the expansion of the strip can be made uniform, a local reduction in thickness can be prevented and as such, damage to the sheet can be mitigated during the expanding operation. Next, since the relief is formed by an inclined surface in such a manner that a peripheral end of the relief is larger than the other end thereof, the portion of the disk-shaped cutter corresponding to the other end of the relief is reinforced so that damage to the disk-shaped cutter can be prevented. Since the apparatus comprises an expanding means for expanding the strip in an approximately thickness direction of the strip except for at a central portion of the strip in the widthwise direction of the strip, the strip can be expanded uniformly and with a comparatively small force.

Although the present invention has been fully described in connection with the preferred embodiments thereof with reference to the accompanying drawings, it is to be noted that various changes and modifications will become apparent to those skilled in the art. Such changes and modifications are to be understood as included within the scope of the present invention as defined by the appended claims unless they otherwise depart therefrom.

W claim:

1. An apparatus for manufacturing a mesh sheet, said apparatus comprising:
   a pair of rolls rotatably supported in the apparatus about respective axes of rotation parallel to one another,
   each of said rolls having a plurality of coaxial disk-shaped cutters,
   the disk-shaped cutters of each respective one of said rolls being spaced from one another along the axis of rotation thereof by intervals approximately corresponding to the thicknesses of the disk-shaped cutters of the other of said rolls, respectively, the disk-shaped cutters of each respective one of said rolls being axially offset from the disk-shaped cutters of the other of said rolls by distances, respectively, corresponding to said intervals, and said rolls being in a meshing coacting engagement at a respective location at which peripheral portions of the disk-shaped cutters of each respective one of the rolls occupy spaces defined between adjacent ones of the disk-shaped cutters of the other of said rolls,
   each of said disk-shaped cutters including a plurality of cutting edge portions and reliefs alternately provided along the periphery thereof,
   said cutting edge portions defining cutting edges extending along the periphery of the disk-shaped cutter; and
   driving means for rotating said rolls about the axes of rotation thereof such that the cutting edges of each of the disk-shaped cutters of both of said rolls and the reliefs of each of the disk-shaped cutters of both of said rolls are alternately brought to said location of meshing coacting engagement,
   whereby when said rolls are rotated by said driving means and a strip is fed longitudinally between said rolls in a direction perpendicular to said axis of rotation, the cutting edges of said disk-shaped cutters will cut groups of slits extending in the longitudinal direction of the strip and spaced from one another in each of said groups in the widthwise direction of the strip so as to define strip-shaped lift portions therebetween, while the reliefs of said disk-shaped cutters leave connecting portions of the strip extending between the adjacent groups of said slits and connecting corresponding ones of the strip-shaped lift portions.

2. An apparatus for manufacturing a mesh sheet as claimed in claim 1, wherein each of said cutting edge portions is an approximately triangular projection projecting from a bottom portion, defining one side of the triangular projection, at the periphery of the disk-shaped cutter to a top portion defining a vertex of the triangular projection such that front and rear surfaces, defining the other two sides of the triangular projection, extend from said top portion at the periphery of the disk-shaped cutter,
   the top portion of the approximately triangular projection being displaced in the direction in which the disk-shaped cutter is rotated by said driving means from a line extending radially of the disk-shaped cutter and bisecting the bottom portions defining said one side of the triangular projection, into two equal parts, and
   said rear surface of the approximately triangular projection being curved and located upstream of said front surface with respect to the direction in which the disk-shaped cutter is rotated.

3. An apparatus for manufacturing a mesh sheet as claimed in claim 1, wherein each of said reliefs is a groove open to one side of the disk-shaped cutter, said groove having one end at the periphery of the disk-shaped cutter and another end located radially inwardly thereof, the bottom of said groove being defined by an inclined surface of the disk-shaped cutter extending from the periphery of the disk-shaped cutter to said one side thereof at an inclination relative to said one side of the disk-shaped cutter such that the cross-sectional area at said one end of the groove is larger than the cross-sectional area at said another end thereof.

4. An apparatus for manufacturing an expanded mesh sheet as claimed in claim 1, and further comprising expanding means operatively associated with said pair of rolls and disposed downstream therefrom in the apparatus for displacing longitudinally extending side portions of a strip cut by said rolls relative to a longitudinally extending central portion thereof in a direction corresponding to the direction of thickness of the strip.

* * * * *

UNITED STATES PATENT AND TRADEMARK OFFICE
CERTIFICATE OF CORRECTION

PATENT NO. : 5,136,765

DATED : August 11, 1992

INVENTOR(S) : Masahiro TANAKA et al.

It is certified that error appears in the above-identified patent and that said Letters Patent is hereby corrected as shown below:

On the title page: in item [75], the given name of the first named inventor has been corrected from "Mashiro" to --Masahiro--.

Signed and Sealed this

Twelfth Day of October, 1993

*Attest:*

BRUCE LEHMAN

*Attesting Officer*  Commissioner of Patents and Trademarks